US007118797B2

(12) United States Patent
Crum

(10) Patent No.: US 7,118,797 B2
(45) Date of Patent: Oct. 10, 2006

(54) PRINTED COMMUNICATION MATERIALS HAVING REDUCED ODOR AND TEXTURAL OR TACTILE PROPERTIES

(76) Inventor: Jesse D. Crum, 1109 207th St., Fort Scott, KS (US) 66701

( * ) Notice: Subject to any disclaimer, the term of this patent is extended or adjusted under 35 U.S.C. 154(b) by 175 days.

(21) Appl. No.: 10/716,787

(22) Filed: Nov. 19, 2003

(65) Prior Publication Data

US 2005/0106364 A1 May 19, 2005

(51) Int. Cl.
*B32B 3/00* (2006.01)

(52) U.S. Cl. ................... 428/195.1; 428/211; 428/212; 428/292.1; 428/325; 106/14.44

(58) Field of Classification Search ............ 428/292.1, 428/195.1, 212, 325, 211.1; 106/14.44
See application file for complete search history.

(56) References Cited

U.S. PATENT DOCUMENTS 4,079,025 A * 3/1978 Young et al. .............. 525/54.3
5,217,791 A * 6/1993 Fujita et al. ................ 428/204
5,879,509 A * 3/1999 Sharyo et al. ................. 162/5
5,951,057 A * 9/1999 Spector ...................... 283/117
6,248,432 B1 6/2001 Moronuki et al.

FOREIGN PATENT DOCUMENTS

JP 07-189179 * 7/1995

* cited by examiner

*Primary Examiner*—Rena Dye
*Assistant Examiner*—Camie S. Thompson
(74) *Attorney, Agent, or Firm*—Michael C. Maier

(57) ABSTRACT

The present invention relates to coatings and compositions suitable for use with imaged or printed products, such as business communication documents, pressure sensitive products, including labels and other materials used in the handling of information, whether intended for a business, personal or informational purposes. More particularly, the present invention is directed to coatings and formulations that can conceal or reduce the odor associated with certain inks, curable coatings, varnishes and the like as well as coatings that can be used in the creation of textural or aesthetic features for such products.

27 Claims, 2 Drawing Sheets

PRINTED COMMUNICATION MATERIALS HAVING REDUCED ODOR AND TEXTURAL OR TACTILE PROPERTIES

CROSS-REFERENCES TO RELATED APPLICATIONS

None.

FIELD OF THE INVENTION

The present invention relates to coatings and compositions suitable for use with imaged or printed products, such as business communication documents, pressure sensitive products, including labels and other materials used in the handling of information, whether intended for a business, personal or informational purposes. More particularly, the present invention is directed to coatings and formulations that can conceal or reduce the odor associated with certain inks, curable coatings, varnishes and the like as well as coatings that can be used in the creation of textural, tactile or aesthetic features for such products.

BACKGROUND OF THE INVENTION

There are many coatings, varnishes, inks, toners, adhesives, overcoatings, washes and the like which can be used by manufacturers to impart various properties or characteristics to the surfaces or substrates to which they are applied. Such materials are widely and commonly used in the printing and graphic arts industry as well as other applications. Their use depends on the specific need, end result or application to which the coated materials or substrates are to be made.

Unfortunately, while these materials meet the various functional needs of the manufacturer such as gloss or shine, they can also come with various undesirable attributes and drawbacks, one of which is the emission of displeasing or unpleasant olfactory properties, which makes use by the customer potentially difficult and may lead to customer complaints depending on the strength of the offending smell or odor and sensitivity of the end user. Manufacturers have thus attempted to combat this situation through the use of the inclusion of perfumes and scents, peppermint, spearmint with vanilla being a particularly popular one. However, with the inclusion of these additional components, comes the expected and undesirable affect of increased prices due to the presence of the perfumes and scents in the coating. Typically, and depending on the type of coating, in order for the scents or perfumes to be effective the scents or perfumes may need to be added in relatively significant amounts in order to overcome the smell or odor that emanating from the coating.

Unfortunately, it has also been found that even with the inclusion of perfumes or scents, while one smell or odor (the original odor) may be decimated, the end user or customer may find the particular perfume or scent that has been included in the coating to be offensive or trigger an allergic reaction, hence destroying the entire intent of producing a product that overcomes the aforementioned drawback.

A yet still further drawback in addition to the expense, is that when synthetic materials are used to conceal the odor of the coating, the coated substrate may loose some of its environmentally friendly characteristics and thus may no longer be acceptable for recycling and may require specific handling and disposal requirements, which again can be costly for the manufacturer and the distributor.

Still another problem with adding or applying such materials to substrates, particularly glossy coatings, materials and the like is that these shinny coatings can create potentially dangerous situations when the coated substrate is inadvertently left on the floor or other surface. The glossy coating has a reduced surface attraction with the surface it is on which can lead potentially to slip and fall accidents by innocent bystanders. In addition, when such glossy materials are placed within a stack, the stack may splay out of alignment making distribution or feeding for subsequent processing difficult and requiring the manufacturer to realign the stack of items.

What is therefore needed is a way to reduce the offending odor of such coatings so that such coatings may continue to be used within the printing and graphic arts industries without customer complaints, as well as to eliminate problems associated with surface affinity so that coated sheets may be handled more efficiently, without increasing the costs of the product or the problems associated with disposal of such coated substrates.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The printing industry as well as affiliated or associated industries such as graphics arts and photography, will commonly use varnishes, overcoatings, coverage materials, washes and the like (hereafter "coatings") to add a protective layer, gloss or sheen or other feature to the product in order to provide the end user with a more desirable offering. Such coatings or topically applied materials (applied topically to a substrate) typically have a distinctive if not unpleasant odor associated with the coatings, which may be due to the presence of amines, aldehydes or other odor emitting components. In addition, printing inks, adhesives and the like (again referred to herein and cumulatively as "coatings") can also carry offensive or displeasing scents to one olfactory capabilities.

The inventor of the present application has surprisingly discovered that through the addition of a starch based component to these coatings that the odor which is typically associated with such products can be reduced if not completely eliminated. In addition, this discovery lead to the unexpected finding that the use of such starch based elements in these coatings can also allow for the creation of textural or aesthetic features to business communication documents thus enabling the manufacturer to readily and easily pass along to the end user or customer various additional attributes which were heretofore unavailable.

The starch based component of the present invention may be a starch ester having from 2 to 100 carbon atoms, may be selected from high or low amylose starches or combinations thereof and can typically be derived from a number of sources such as corn, rice, wheat, potato, tapioca, maize, sorghum and other starches and starch flours and combinations thereof. The starch component of the present invention can range from about 0.01% to 99.9% of the weight of the coating, with the exact percentages determined based on the needs of the end user or the particular application being sought by the manufacturer or end user.

It has been found that the starch or starch ester may be added directly to the coating (mixed with the coating) without any additional treatment prior to its inclusion or application of the coating to the substrate. Of course, it is within the scope of the invention to add modifiers, enhancers and other components which may be helpful in modifying the performance of the invention.

In one embodiment of the present invention a coating for printed or imaged products is described and includes a substrate for use in business communication. The substrate having at least a first coating applied to the substrate and a starch component is added to the first coating to conceal odor of the coating.

In a still further embodiment of the present invention a coating for providing aesthetic, tactile or textural characteristics to printed or imaged products is provided and includes a substrate that is suitable for receiving printing or imaging and at least a first coating applied to the substrate. The coating includes a starch component that may be added to the coating either at the time it is prepared or prior to the time of applying the coating to the substrate. The coating, with its starch component is used to produce aesthetic, tactile or textural characteristics on the substrate.

In a yet still further embodiment of the present invention, a printed or imaged product having aesthetic or textural characteristics is described and includes a substrate suitable for receiving printing or imaging with at least a first coating applied to at least a portion of the substrate. The first coating has a starch component, which may be added thereto. Through the application of the first coating to the substrate, such as by printing, imaging, coating, spraying or the like, the first coating produces raised textural, tactile or aesthetic characteristics on the substrate.

The textural or aesthetic characteristics may be selected from a group including animate, inanimate objects, geometric shapes, alpha character, numeric characters and combinations thereof so as to be able to highlight certain themes, messages, occasions, events and the like.

In a still further illustrative embodiment of the present invention, glossy printed or imaged sheet having improved surface affinity for improved feeding and handling, is described and includes a substrate that is suitable for receiving a glossy coating. At least a portion of the substrate has a glossy coating applied to it in order to create a coated area of the substrate. The coating includes a starch component which creates surface discontinuities in the coated area of the substrate.

The glossy printed or imaged substrate of the above mentioned illustrative embodiment can be used to create business communication pieces, brochures, folders, tickets, cards, photographs, marketing collateral, presentation materials and combinations thereof.

In a further exemplary embodiment of the present invention a coated sheet intended for use as a business communication piece is described and includes a substrate, a starch selected from a group including corn, potato, wheat, rice, tapioca, maize, sorghum and other starches and starch flours and combinations thereof and starch esters thereof and at least a first coating, with the first coating containing between about 0.01% and about 99.9% by weight of the starch. The first coating is applied to at least a portion of the substrate.

The coated sheet in the above referenced embodiment creates a feeding assist means for post coating processing equipment. That is, the coating enables such processing equipment to more readily grab and process the substrates due to the presence of the coating on at least a portion of the substrate.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

Figure 1:
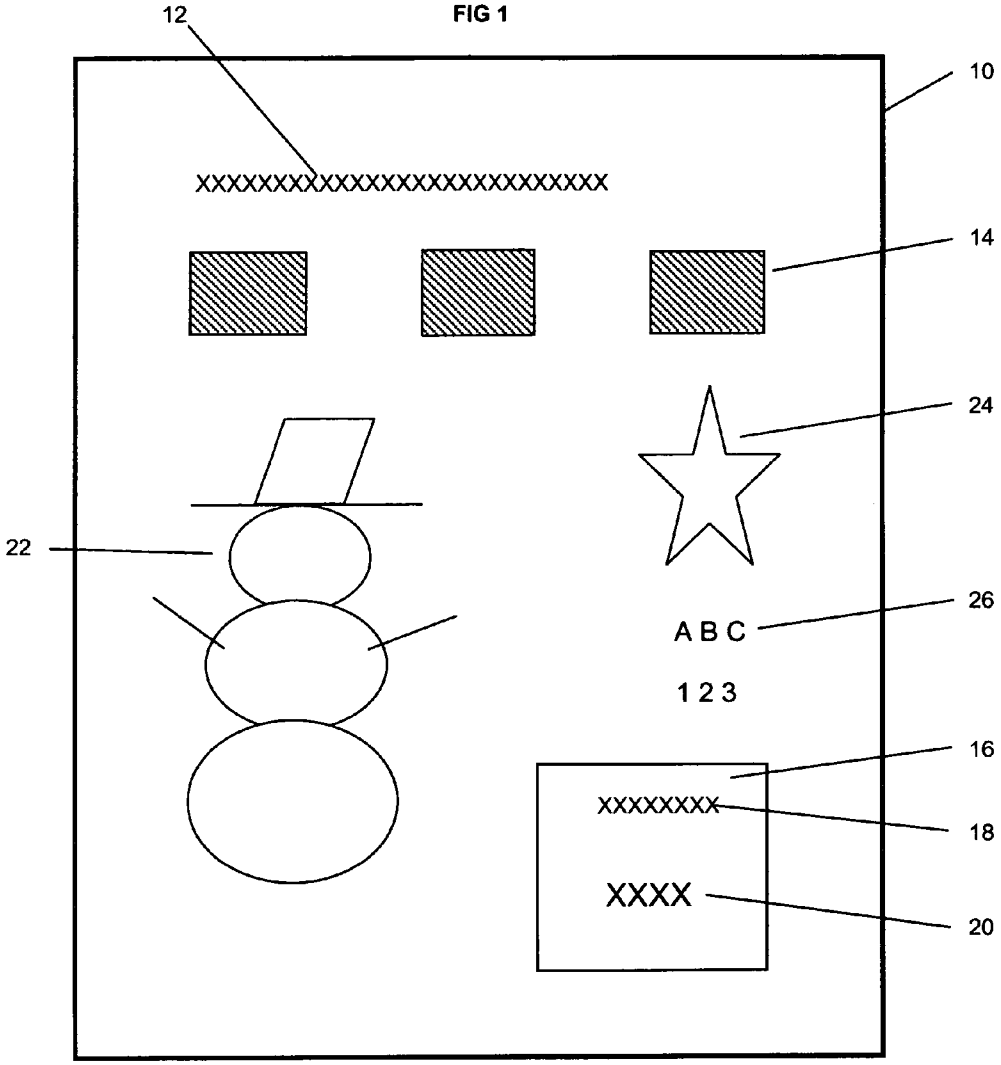
FIG. 1 depicts front view of a substrate to which the coating of the present invention has been applied and illustrates the variable application of the coating.

The present invention is now illustrated in greater detail by way of the following detailed description, but it should be understood that the present invention is not to be construed as being limited thereto.

As used herein, the term "coating" refers to varnishes, overcoats, curable coatings, inks, toners, adhesives, washes, finishes, surface modifying agents (those intended to change the appearance, feel, etc.) coverage material and mixtures of two or more and combinations thereof.

Surprisingly, it has been found that through the use of a starches or starch esters, such as those derived from corn, rice, wheat, potato, tapioca, maize, sorghum and other starches and starch flours and combinations thereof, that offensive or unpleasant odors of coatings can be substantially reduced and even eliminated when compared with coatings without such starches or starch esters.

Without wishing to be bound to any particular theory, it is believed that the starch or starch esters have the ability to sequester and bind with the elements of the coating that the starch is being incorporated into. With certain modified starches, for instance cyclodextrins, the starch has a substantially cyclic structure and is able to hold component of the coating within the ring thus preventing their escape so as to emit the offensive odor or smell.

Even more unexpectedly, and as an unanticipated outgrowth of the foregoing efforts to conceal unpleasant odors, it has been discovered by the inventor that a coating which includes starch or starch esters can be used to create textural areas (having raised (visual) or tactile features or attributes) on the substrate in selected or predetermined areas so as to create additional interest in printed or imaged documents or to provide printed or imaged substrates over which the entire area of the substrate has been coated in order to generate a sheet that is unique in its appearance. In addition, it has been found that the coating can be manipulated to increase or decrease the amount of surface discontinuities by altering (increasing or decreasing) the amount and or type of starch that is used in connection with the preparation of the coating. The coatings can also be manipulated to create specific patterns or shapes, such as animate, inanimate, geometric as well as the more typical alpha and numeric characters normally associated with printing and imaging.

As the present invention can be used in the creation of tactilely unique patterns, the coatings prepared in connection with the present invention may be applicable to creating tactile guides and other tactilely prepared materials (Braille) so as to assist the visually impaired in enjoying materials with text. That is, the present invention can be used in the preparation of tactile characters (alpha and numeric representations readable by the visually impaired).

Moreover, through the use of starch in coatings as described in the present invention, the inventor has found an economical and environmentally friendly way in which to address problems created through the use of printing, photography and graphic arts coatings as well as a means through which emphasis can be added to highlight or attract attention to portions of substrates or documents in order to peak interest in such offerings.

Varnishes, washes, overcoats, whether or not curable by application of additional treatment steps (such as radiation, heat and the like) are often selected in order to impart a particular characteristic or characteristics to the substrate to which it is being applied. In some instances, the coating may be selected to add a glossy finish to the substrate, in others such coatings may be used to impart a protective covering such as a water or moisture proof coating.

The coating of the present invention may be used in any number of applications depending on the needs of the end user or the catalog or product offering of the manufacturer to create business forms, pressure sensitive products, information handling materials business communication pieces, coupons, cards, tickets, greeting cards, brochures, folders, tickets, cards, photographs, marketing collateral, presentation materials and combinations thereof.

In an exemplary embodiment illustrating use of the invention, a UV curable varnish, such as UV30LI available from Northwest Coatings Corp., Oak Creek, Wis. 53154 and is composed of various acrylate monomers and oligomers. The coating maintains a boiling point of greater than 200° C., a vapor density of greater than 1 (air=1), an evaporation rate of greater than 1 (n-Butyle Acetate=1) and a vapor pressure of less than 1 (MM HG at 25° C.). Corn starch, available from any retail or wholesale outlet such as grocery stores (Safeway, Giant, Kroger, Dillions, Wal-Mart, Target, Sam's Club, etc.) is added to the material in an amount ranging from 0.01% to 99.9% by weight, with about 2 to about 50% being preferred and about 6 to about 45% being still more preferred.

In addition to corn starch, the invention may also be used with potato, rice, wheat, tapioca, maize, sorghum and other starches and starch flours and combinations thereof. Starches may also be purchased in bulk from National Starch and Chemical Company, Chicago, Ill. In addition, starch esters may also be used having between 2 and 100 carbon atoms and can include starch acetate, starch butyrate, starch hexanote, starch benzoate, starch propionate and combinations of the foregoing. The invention may also use high amylose starch (starch having at least 45% and likely more than 65% amylose content) or low amylose starch (starch having less than 45% amylose content and preferably less than 35%).

The production of the present invention is relatively straight forward and includes the provision of a first sheet of material, such as a cellulosic based stock (20 pound bond to 100 pound card stock—any suitable bond may be used). The UV curable coating is thoroughly mixed with approximately 10 to 12% by weight corn starch. Mixing can be achieved through any suitable device such as a blender or the like. The UV curable coating with starch added is applied to the substrate in a thickness ranging from about 0.001 mils to 7 mils with about 0.01 to 3 mils being preferred.

The coating may be applied throughout the entire area of the substrate so as to create a completely coated sheet or a substantially coated sheet or the coating may only appear or be applied in predetermined or selected areas of the substrate or in areas such as to create removable, labels, tags or other elements or to illustrate certain portions of the message to be conveyed to the recipient.

The coating may be applied through the use of fountains, meyer rods, curtains, sprays, vapor deposition, anilox rollers, gravure, reverse gravure, flexographic, printers (laser, ink jet, electrostatic, etc.) and such other means as are known and suitable for use in applying coatings.

Once the substrate is created the sheet is in an intermediate condition in that the sheet or coated substrate will need to be subjected to a curing step to treat the UV curable material. The intermediate is then forwarded to a curing station where at least one if not additional UV curing stations which contain UV bulbs that are provided for curing purposes. The curing stations may use "H" bulbs described below and/or the Gallium bulb, which is also described below.

In practicing an exemplary embodiment of the present invention, a series of UV curing bulbs, which can be positioned in a side by side, adjacent or sequential configuration, can be used. In an exemplary embodiment, a single bulb may allow a UV cure rate of approximate 50 feet per minute, while plural bulbs disposed in a side-by-side or adjacent configuration permits a higher curing rate of approximately 75 feet per minute. Obviously, other curing station configurations may be used in order to increase the possible through put rate of the equipment and processing of the substrates to be printed.

Exemplary bulbs used in the embodiment of the present invention are "H" bulbs and Gallium doped bulb suitable for use in the UV curing processes, however, it should be understood that other UV curing may be used in accordance with the present invention and the present invention is not limited hereto.

The "H" bulb is generally known as a mercury vapor bulb and is used typically for top surface curing applications. The Gallium doped bulb is used in connection with a requirement for deeper penetration such as within a slurry. The UV bulbs such as those described above along with reflectors, to focus or concentrate the energy, are available from the GEW Company, located in North Royalton, Ohio. Alternatively, a combination of both topical and penetration curing can result in a combination of curing energies sufficient to carry out the present invention.

The foregoing exemplary product may then be used in the preparation of business forms with detachable or removable elements, business communication pieces, marketing or advertising collateral or any other end use for which the initial selected stock and coating are suitable. The exemplary varnish normally creates a slightly glossy finish and can be further manipulated through the addition of greater amounts of starch to create a dulled or matte finish in the final product.

With the preparation and manufacture of glossy coated stock, the starch or starch ester based coating has the additional benefit of increasing the surface affinity or frictional interaction between the sheet and another sheet, such as when placed into a stack or between the sheet and another surface such as a floor, table, countertop or the like. This improves the handling of the coated stock so that the stock may be more readily passed for subsequent processing, such as for additional printing or imaging, inserting and other post coating treatment steps.

Through the inclusion of starch in the coating of the present invention, the coating facilitates the grabbing by the infeed apparatus of processing equipment, such as a printer, sorter, inserter and the like. The textural or tactile features created on the surface enable the coated substrate to be more easily acquired by the apparatus, thus reducing slippage and timing errors created by generally coated glossy stock.

Turning now to FIG. 1, the substrate is generally depicted by reference numeral 10. The substrate of the present invention may be any suitable material that is capable of receiving a coating. Typically in the printing and graphic arts industry cellulosic based stock material is commonly used, and may be paper, card or tag stock, cardboard and the like. However, the present invention is also suitable for use with synthetic films and sheets, such as plastic like materials, metal films, sheets and any other material than can receive coatings.

The substrate 10, is provided with imaging or printing as depicted by reference numeral 12 and such imaging or printing may be information related to the particular offering (generic, static or fixed information) or may be personalized to the specific individual (name, address, contact numbers, important dates, exclusive offers, account numbers, etc.). The imaging or printing 12 can be provided through ink jet, laser printers or any other suitable means known in the industry. Additional printing is provided at 14 and includes areas that have been produced using a starch in the coating so that enhanced, raised or textural (tactile) areas of the substrate can be felt and seen as different or distinct from text area 12 through casual inspection of the substrate.

Through the use of the starch in the coatings, and depending on the percentage of the starch utilized, as well as possibly the type, the printed, imaged or applied areas can have a roughened or "fuzzy" feel. That is, the areas created through the use of the starch included coating has a discontinuous surface area creating the textural, tactile or aesthetic attributes of the present invention.

The substrate 10 of the present invention may also be provided with a pressure sensitive portion, here depicted generally by reference numeral 16. It should be understood, that while FIG. 1 illustrates the pressure sensitive portion as a small label segment, such as one might find with an integrated or blown on label, it should be understood that the entire substrate may have pressure sensitive properties (the sheet is coated with an adhesive and has an underlying release liner) or alternatively, as shown only portions of the substrate have pressure sensitive properties. In addition, instead of labels, the sheet may have removable elements such as tags which can be easily separated from the substrate, such as through die cuts, perforations, etc.

The label or pressure sensitive segment 16 is again provided with standard or regular printing or imaging 18 (static, fixed, personalized) and the imaging or application of the coating of the present invention is provided at 20 showing a distinction between the two printing areas and the enhanced or aesthetic features created by the coating of the present invention.

Continuing with the description of FIG. 1, the FIGURE also depicts the various types of printing, imaging or applications that are capable of using the present invention. Reference numeral 22 depicts an animate object, numeral 24 a geometric shape or inanimate object and numeral 26 shows alpha and numeric characters. Having a discontinuous surface area that appears to be "fuzzy" can be helpful in giving life to animate objects such as by creating fur or hair on an animal, snow or ice on a snowman, finish on furnishings (in the case of inanimate objects) and the like.

It should be understood that the printing, imaging or application of the starch containing coating of the present invention may be used variably, that is to only highlight or emphasize certain areas of the substrate or portions of the message being conveyed to the end user or alternatively could be used throughout the entire area of the substrate to create a unique communication piece.

Figure 2:
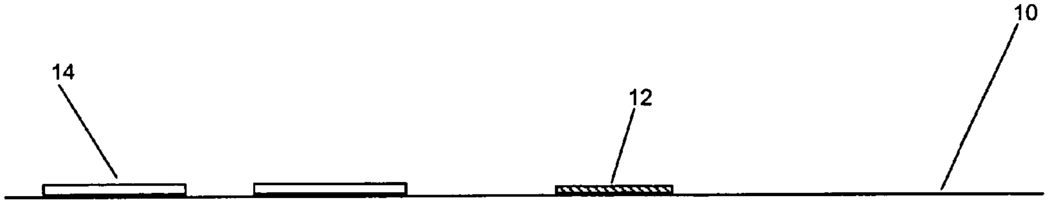
FIG. 2 shows a side elevation of the substrate of FIG. 1, which provides the raised or enhance textural or aesthetic features of the coating of the present invention.

Turning now to FIG. 2 of the present invention, a side elevation is provided and shows the substrate 10 having raised or tactilely distinct areas from other portions of the substrate and generally depicted by reference numeral 14. These raised or tactilely distinct areas are created through the use of the coating of the present invention and are visibly and tactilely distinct when compared with traditionally coated or printed areas 12 as usually appear in traditionally prepared products.

Figure 3:
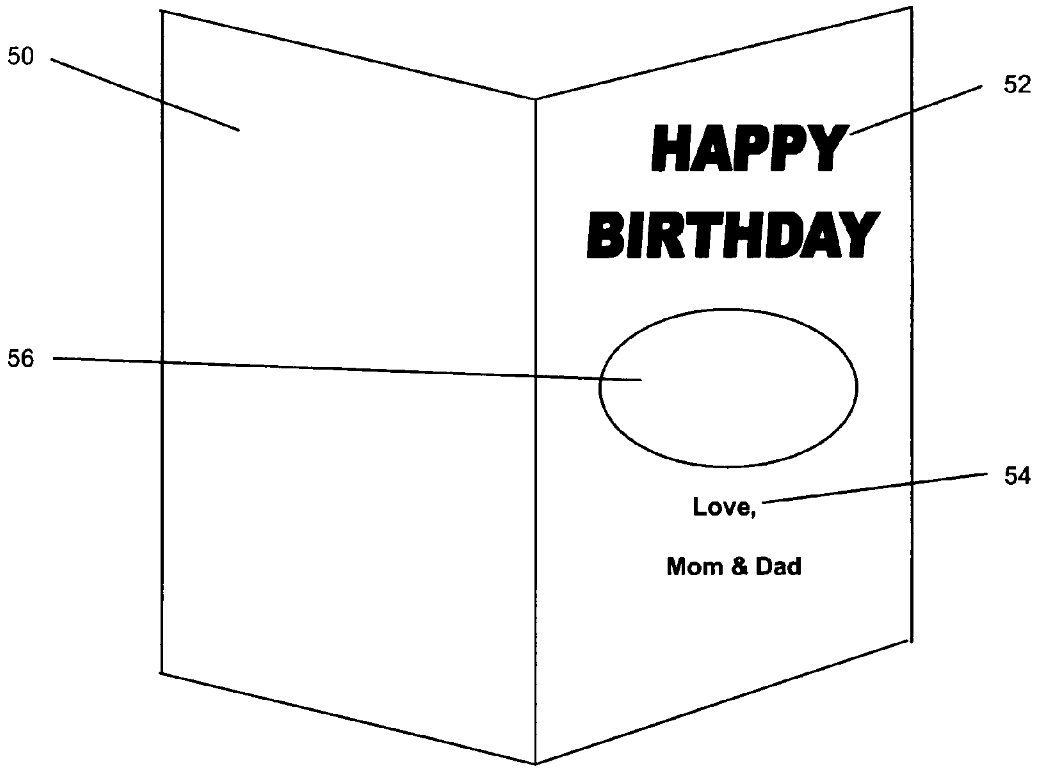
FIG. 3 illustrates an exemplary use of the present invention where the substrate is a greeting card having enhanced aesthetic, textural and/or tactile properties due to the coating of the present invention.

FIG. 3 represents an exemplary use of the present invention, particularly with the ability to create textural, tactile or aesthetic areas on a substrate. In FIG. 3, a greeting card is generally depicted by reference to numeral 50 and may contain traditional printing or imaging such as 52 and then the enhanced textural or aesthetic printing in areas designated by reference numerals 54 and 56. These textural areas may contain alpha and numeric characters or may be provided with animate or inanimate shapes depending on the desires of the manufacturer and end users. Greeting cards as used herein generally refer to communications intended to convey sentiments and or acknowledge an event.

Figure 4:
FIG. 4 provides a further exemplary use of the coating of the present invention and shows a card, coupon or ticket having normal printing or imaging and enhanced imaging attributable to the coating of the present invention.

FIG. 4 illustrates yet another embodiment of the present invention. Reference numeral 60 generally depicts the outline of a card, coupon or ticket which may again be provided with traditional printing 62 and then the enhanced textural printing or coating 64 created through the use of the present invention. The textural printing 64 can be used to emphasize an event such as a sale or discount "10% Off". However, it should be readily understood that the printing could be used to illustrate other important information such as phone numbers, names, dates, events and the like.

Through the use of the present invention, the manufacturer is provided with a mechanism by which to reduce if not completely conceal the odor that is typically associated with coatings as well as the unexpected benefit of generating textural or aesthetic areas on the substrate through the use of varying percentages of starch.

One of the most important things with respect to new product innovations is the need to effectively market and communicate the new product to potential customers and end users of the product. Such marketing typically includes the creation of marketing collateral associated with the features of the coating and its benefits and uses. These unique product attributes are sold in connection with that marketing collateral and then distributing the end product to potential end users and customers or transferring the technology to others for incorporation in their respective products. Customers can include distributors of such products as well as office supply stores, retail and warehouse outlets, photography supply stores, manufacturers of such coatings which themselves may not be end users, but may repackage and resell the products to end users or third parties.

Marketing collateral as used herein includes the use of scripted or prepared material that are distributed through audio and visual communication mediums, over a global communication network, through printed mediums such as newspapers, trade publications, magazines, fliers, handouts and the like.

It will thus be seen according to the present invention a highly advantageous communication document having a unique coating has been provided. While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

The invention claimed is:

1. A coated printed or imaged product comprising;

a substrate for use with printed business communication said substrate is provided with printed indicia;

at least a first glossy coating applied to said substrate in connection with said printed indicia;

said first coating including a starch component that ranges from about 2% to about 50% by weight of said first coating to conceal odor of said first coating;

said first coating is applied over a portion of said printed or imaged indicia in a thickness ranging from 0.001 mils to 7 mils to provide a texturally distinct highlight to at least said portion of said printed indicia; and wherein said textually distinct highlight is selected from a group including animate, inanimate objects, geometric shapes, alpha character, numeric characters and combinations thereof.

2. A coated printed or imaged product as recited in claim 1, wherein said starch is selected from a group including corn, potato, wheat, rice, tapioca, maize, sorghum and other starches and starch flours and combinations thereof.

3. A coated printed or imaged product as recited in claim 1, wherein said substrate is selected from a group including business forms, pressure sensitive products and combinations thereof.

4. A coated printed or imaged product as recited in claim 1, wherein said first coating is selected from a group including varnishes, overcoatings, inks, adhesives, curable coatings and combinations thereof.

5. A coated printed or imaged product as recited in claim 1, wherein said starch is a starch ester having from 2 to 100 carbon atoms.

6. A coated printed or imaged product as recited in claim 1, wherein said starch includes high amylose corn starch.

7. A coated printed or imaged product as recited in claim 1, wherein said starch includes low amylose corn starch.

8. A coated printed or imaged product having aesthetic, tactile or textural characteristics, comprising;

a substrate suitable for receiving printing or imaging and having printing or imaging applied thereto to produce a printed substrate useable as a business communication;

at least a first glossy coating applied over at least a portion of said printed substrate said coating applied in a thickness ranging from 0.00 1 mils to 7 mils to create a texturally distinct highlight;

a starch component that ranges from about 2% to about 50% by weight of said first coating is added to said first coating to produce aesthetic or textural characteristics when applied, coated, printed or imaged on said printed substrate; and wherein said textural, tactile or aesthetic characteristics may be selected from a group including animate, inanimate objects, geometric shapes, alpha character, numeric characters and combinations thereof.

9. A coated printed or imaged product as recited in claim 8, wherein said substrate is selected from a group including business forms, pressure sensitive products and combinations thereof.

10. A coated printed or imaged product as recited in claim 9, wherein said starch component ranges from about 0.01% to about 99.9% by weight of said first coating.

11. A coated printed or imaged product as recited in claim 9, wherein said starch component is a starch ester having from 2 to 100 carbon atoms.

12. A coated printed or imaged product as recited in claim 9, wherein said starch component is selected from a group including corn, potato, wheat, rice, tapioca, maize, sorghum and other starches and starch flours and combinations thereof.

13. A coated printed or imaged product as recited in claim 9, wherein said tactile characteristics can be used in the preparation of reading materials for visually impaired individuals.

14. A printed or imaged product having aesthetic, tactile or textural characteristics, comprising;

a substrate suitable for receiving printing or imaging for a business communication;

at least a first glossy coating applied to at least a portion of said substrate, said first coating having a starch component that ranges from about 2% to about 50% by weight of said first coating and said coating having a thickness a thickness ranging from 0.001 mils to 7 mils; and said first coating producing raised textural, tactile or aesthetic characteristics on said substrate after application to said substrate to create a business communication; and wherein said textural or aesthetic characteristics may be selected from a group including animate, inanimate objects, geometric shapes, alpha character, numeric characters and combinations thereof.

15. A printed or imaged product as recited in claim 14, wherein said starch component ranges from about 0.01% to about 99.9% by weight of said first coating.

16. A printed or imaged product as recited in claim 14, wherein said starch component is a starch ester having from 2 to 100 carbon atoms.

17. A printed or imaged product as recited in claim 14, wherein said substrate is a greeting card.

18. A printed or imaged product as recited in claim 14, wherein said substrate is used for coupons, cards, tickets and combinations thereof.

19. A printed or imaged product as recited in claim 14, wherein said substrate with said coating has tactile characters.

20. A glossy printed or imaged sheet having improved surface affinity for improved feeding and handling, comprising;

a substrate suitable for receiving a glossy coating and at least a portion of said substrate receiving a glossy coating to create a coated area, said coated area having a thickness a thickness ranging from 0.001 mils to 7 mils, said substrate used as a business communication and said glossy coating creating a texturally distinct highlight selected from a group including animate, inanimate objects, geometric shapes, alpha character. numeric characters and combinations thereof; and a starch component that ranges from about 2% to about 50% by weight of said glossy coating is added to said glossy coating to create surface discontinuities in said coated area of said substrate to produce textural characteristics on said substrate to improve surface affinity for improve feeding and handling.

21. A glossy printed or imaged sheet as recited in claim 20, wherein said starch component is selected from a group including corn, potato, wheat, rice, tapioca, maize, sorghum and other starches and starch flours and combinations thereof.

22. A glossy printed or imaged sheet as recited in claim 20, wherein said substrate is used to create business communication pieces, brochures, folders, tickets, cards, photographs, marketing collateral, presentation materials and combinations thereof.

23. A glossy printed or imaged sheet as recited in claim 20, wherein marketing collateral is prepared in connection with said sheet.

24. A glossy printed or imaged sheet as recited in claim 20, wherein said starch component is a starch ester having from 2 to 100 carbon atoms.

25. A coated sheet intended for use as a business communication piece, comprising;

a substrate;

a starch selected from a group including corn, potato, wheat, rice, tapioca, maize, sorghum and other starches and starch flours and combinations thereof and starch esters thereof; and at least a first glossy coating applied to said substrate, said first coating containing between about 0.01 and 99.9% by weight of said starch and said first coating applied to at least a portion of said substrate to create surface discontinuities to provide textural characteristics on said substrate, said coating is applied in a thickness ranging from 0.001mils to 7 mils; and wherein said textural characteristics are selected from a group including animate, inanimate objects, geometric shapes, alpha character, numeric characters and combinations thereof.

26. A coated sheet as recited in claim 25, wherein said substrate is suitable for use in preparing business communication pieces, brochures, folders, tickets, cards, photographs, marketing collateral, presentation materials and combinations thereof.

27. A coated sheet as recited in claim 25, wherein said substrate with said coating applied to a portion thereof creates a feeding assist means for post coating processing equipment.

* * * * *